Aug. 4, 1959 A. J. MEYER 2,898,038

FUNCTION COMPUTERS

Filed Sept. 12, 1956 4 Sheets-Sheet 1

INVENTOR.
ANDRE J. MEYER
BY Hauke & Hardesty
ATTORNEYS

INVENTOR.
ANDRE J. MEYER
BY Hauke & Hardesty
ATTORNEYS

INVENTOR.
ANDRE J. MEYER
BY Hauke & Hardesty
ATTORNEYS

INVENTOR.
ANDRE J. MEYER
BY Hauke & Hardesty
ATTORNEYS

United States Patent Office 2,898,038

Patented Aug. 4, 1959

2,898,038

FUNCTION COMPUTERS

Andre J. Meyer, Elyria, Ohio

Application September 12, 1956, Serial No. 609,400

6 Claims. (Cl. 235—61)

My invention relates to mechanical computers and more especially to a simplified mechanism for producing a desired functional mechanical movement particularly adapted for direct reading of mathematical relationships from a plurality of scales or dials.

Mathematical relationships such as logarithmic functions, trigonometric functions, hyperbolic functions, Bessel functions, involute functions, and others are commonly used in astronomy, navigation, surveying and many other branches of the theoretical and applied sciences and engineering, where accurate numerical computations have to be carried out. For the purposes of the present invention, a logarithmic computer is shown, although the basic principles involved may be readily applied to the development of other functional computers merely by using differently designed cams and the proper scales.

Logarithms are particularly useful in problems whereever physical quantities are related to each other by means of experimental functions. In such cases long hand computations are impossible and logarithms offer the only means of arriving at numerical solutions.

A well known mechanical computing device based on logarithms is the slide rule. Its greatest advantage is in yielding direct answers without requiring intermediate manual calculations. Another asset is its versatility, but a vital drawback is the fact that its accuracy is limited, generally to no better than three places. Moreover, there are many functions such as those involving high powers and those where the final solution is obtained as the difference between two small numbers, in which the common slide rule is worse than useless. Larger, more accurate, and more complex slide rules have been constructed, but these have only limited application and are rarely worth the cost and the trouble to use them. Generally it is simpler and often faster to revert to the use of logarithmic tables.

Those who make frequent use of such tables know that the process of continually looking up logs and anti-logs is a tedious, nerve wracking job, requiring careful search through many pages and columns of figures as well as performing mathematical interpolations. The slightest inattention may result in serious errors, so the work must be continually checked and rechecked, and the demand for individual concentration can and does become intolerable.

Heretofore, mechanical computers developed in attempts to solve such problems have not been entirely successful. Many inventors have had hunches as to the correct solution but only some have succeeded in obtaining constructions that produce even rough approximations. Some devices may at first glance appear deceptively simple, but heretofore no functional computer has been developed which is mathematically correct, its precision being only a function of the accuracy of workmanship.

An object of my invention is to facilitate mathematical computations by providing an accurate mechanical computer for replacing mathematical function tables.

Another object of my invention is to simplify numerical function transpositions by providing a direct reading function computer comprising mathematically dissimilar cams interconnected through direct-acting racks and gears.

A further object of my invention is to construct an improved function computer by providing a mechanism comprising dissimilar cams mounted on rotatable shafts which are mutually actuated by suitable means such as gears on said shafts meshing with racks slidably contacting the same.

For a complete understanding of my invention, reference may be had to the accompanying drawings illustrating a preferred embodiment of the invention in which like characters refer to like parts throughout the several views and in which Fig. 1 is an elevational view illustrating the front dial face of a preferred computer utilizing my invention.

It will be noted that throughout the following description certain reference numbers have subletters N or L, these referring respectively to the "number" and "log" mechanism parts for a clearer understanding of the construction and operation of the computer.

Figure 2:
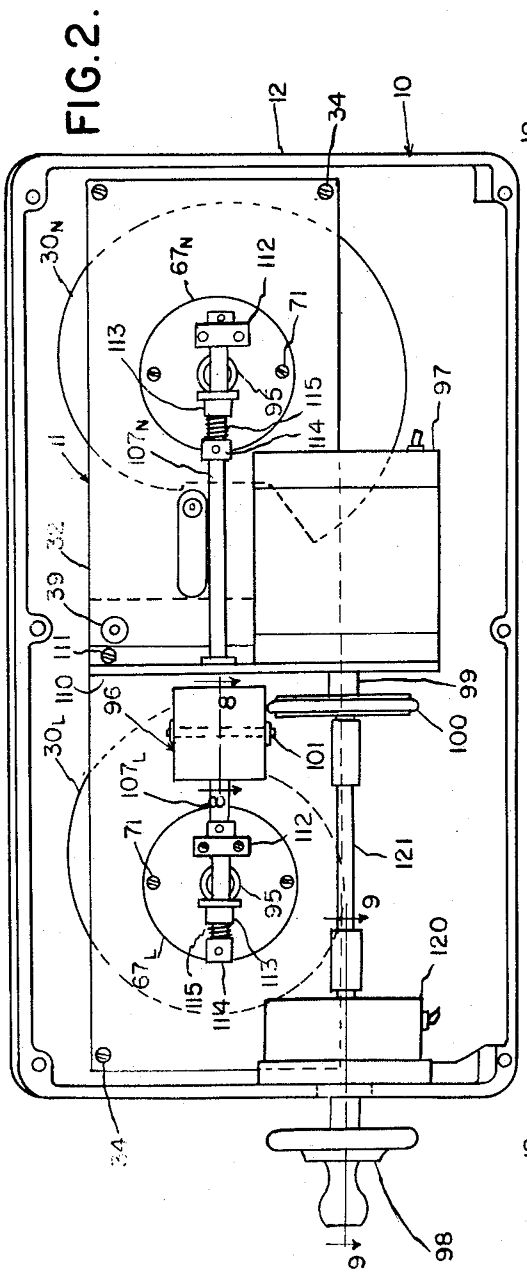
Fig. 2 is an elevational view of the opposite or rear side of the computer with the rear coverplate removed for convenience to show some of the internal mechanism.
Figure 1:
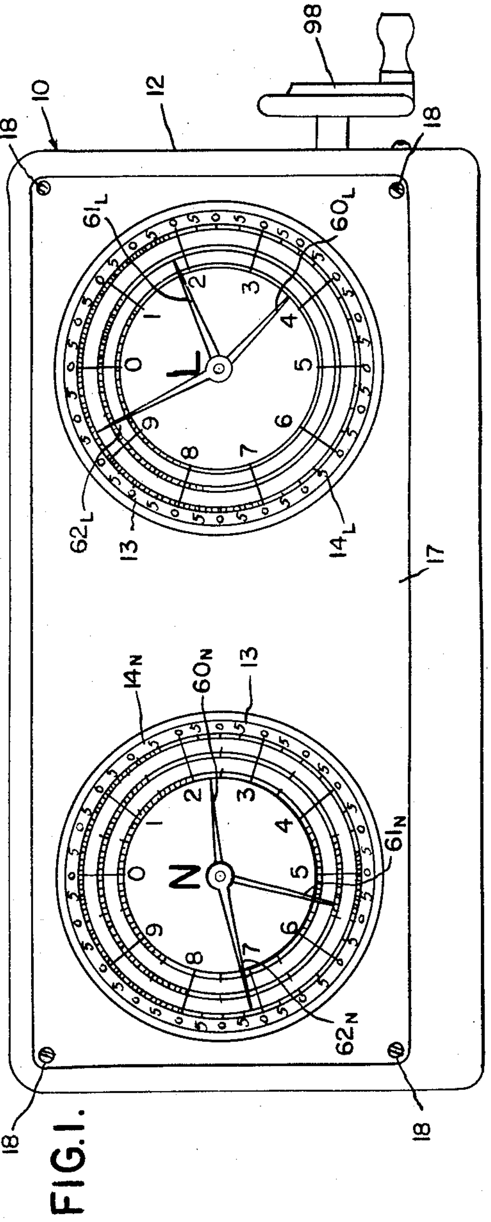
Figures 5, 7, 13, 14:
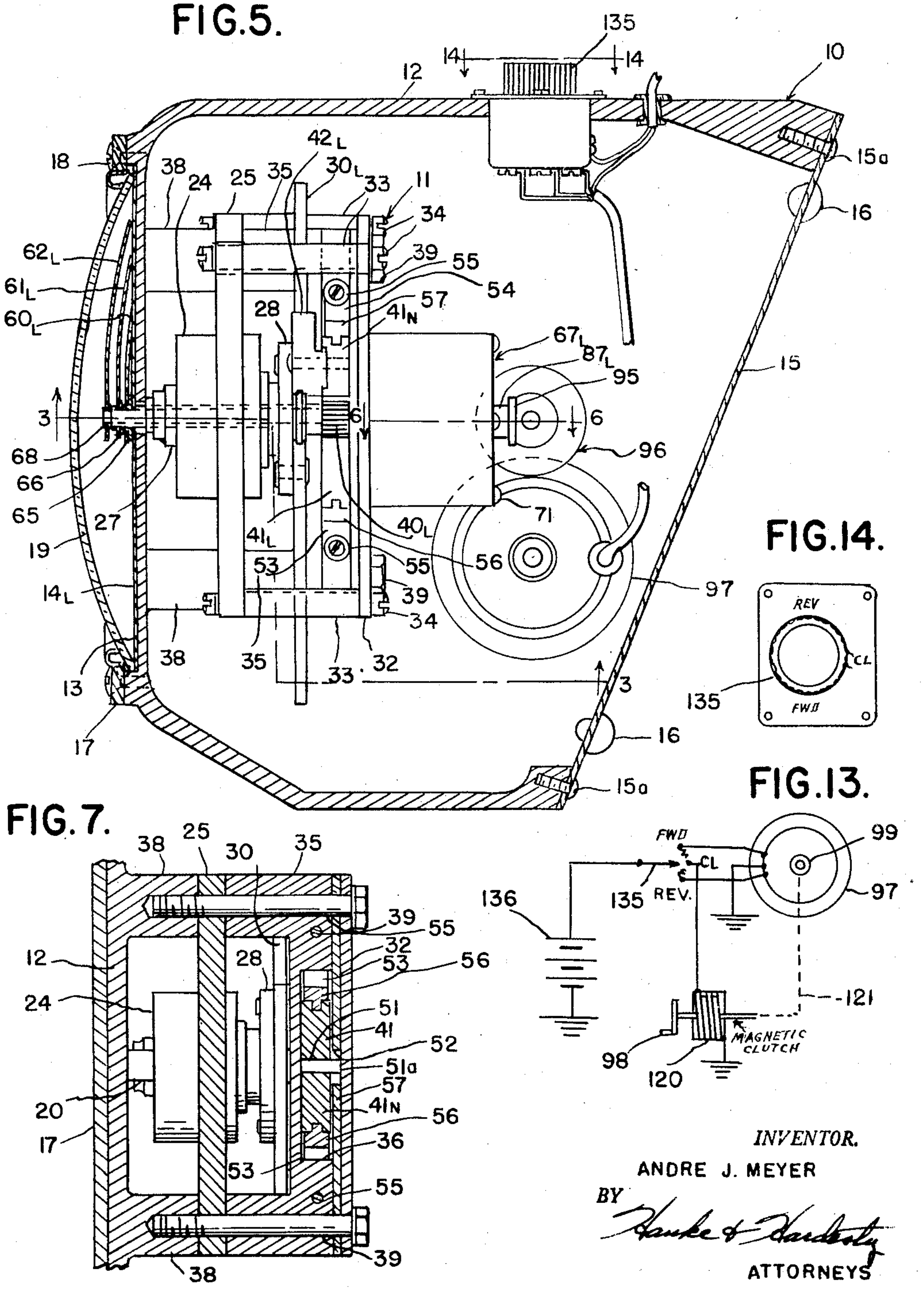
Fig. 5 is a side elevational view of the computer with the housing shown in section.
Fig. 7 is a cross sectional detail view taken substantially on the line 7—7 of Fig. 3.
Fig. 13 is an electrical schematic showing the electrical operation of the computer.
Fig. 14 is a view of the switch as seen substantially from the line 14—14 of Fig. 5.

As seen particularly in Figs. 1, 2, and 5, a housing structure 10 is illustrated as enclosing and carrying a computer mechanism 11. The housing structure 10 comprises a box-like casing 12 having front recesses 13 in which are carried appropriate numerical dials $\mathbf{14}_N$ and $\mathbf{14}_L$, and a rear plate 15 removably secured by any means such as screws **15*a* to the casing 12 and preferably carrying feet 16** for setting the computer on a desk.

A front plate 17 is secured by screws 18 or any suitable means to the casing for retaining transparent faces 19 over the dials $\mathbf{14}_N$ and $\mathbf{14}_L$. For convenience in understanding the computer mechanism 11 throughout the following description, logarithmic functions are referred to. One of the two dials shown is marked with an "N" and refers to the "number" or "anti-logarithm," the other dial being marked with an "L" and referring to the "logarithms" of the numbers indicated on dial "N."

Figures 3, 8, 9, 12:
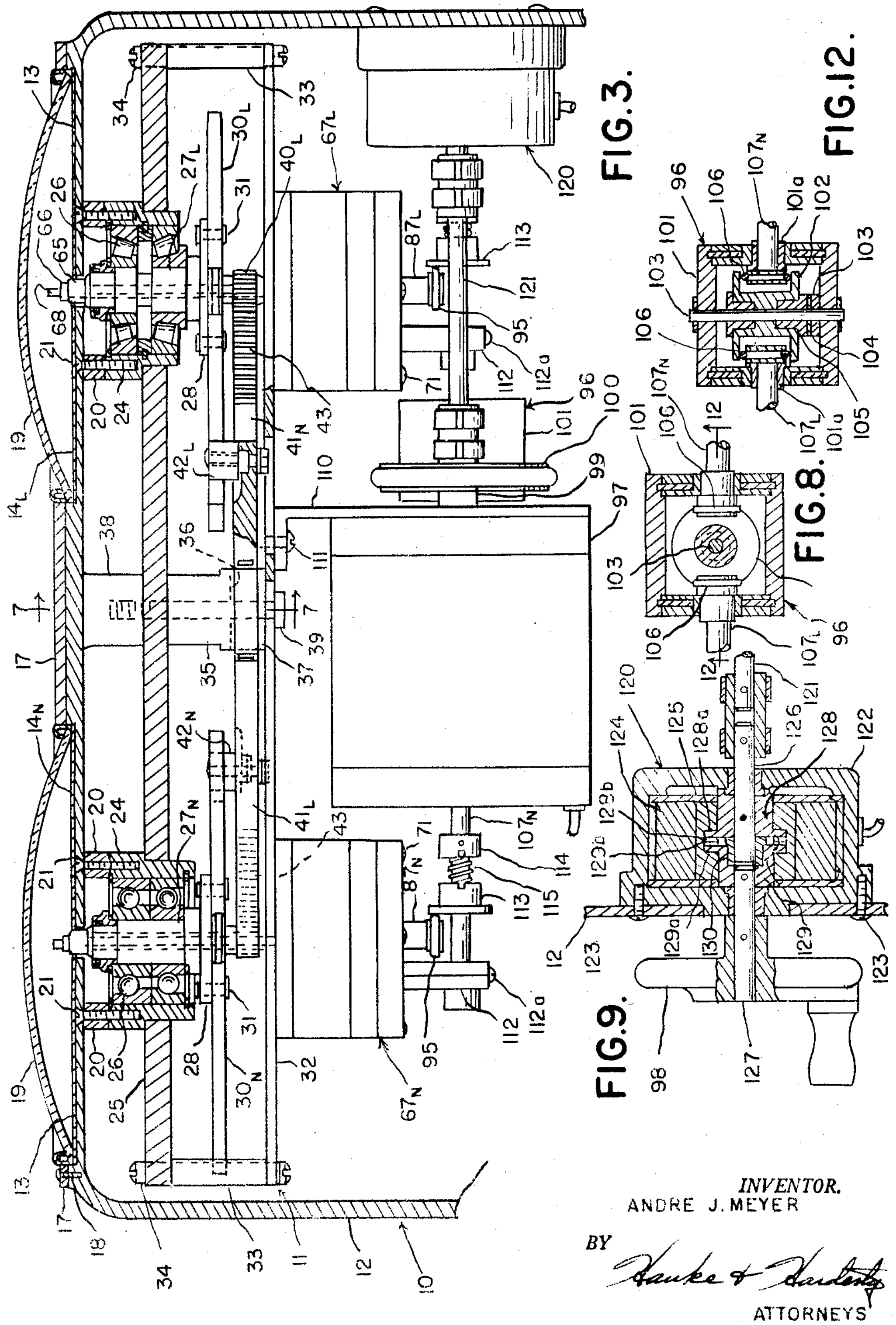
Fig. 3 is a sectional view taken substantially on the line 3—3 of Fig. 5.
Fig. 8 is a cross sectional detail view taken substantially on the line 8—8 of Fig. 2.
Fig. 9 is a cross-sectional detail view taken substantially on line 9—9 of Fig. 2.
Fig. 12 is a cross-sectional view taken substantially on the line 12—12 of Fig. 8.

As illustrated in Fig. 3, bearing housings 24, preferably welded to a mounting plate 25 and secured to the casing 12 with spacers 20 and screws 21, carry preloaded bearings 26 which support hollow camshafts $27_L$ and $27_N$. The shafts $27_L$ and $27_N$ are provided with flanges 28, and dissimilar cams $30_L$ and $30_N$ are secured to the flanges 28 by any means such as rivets 31.

Figures 4, 6, 10, 11:
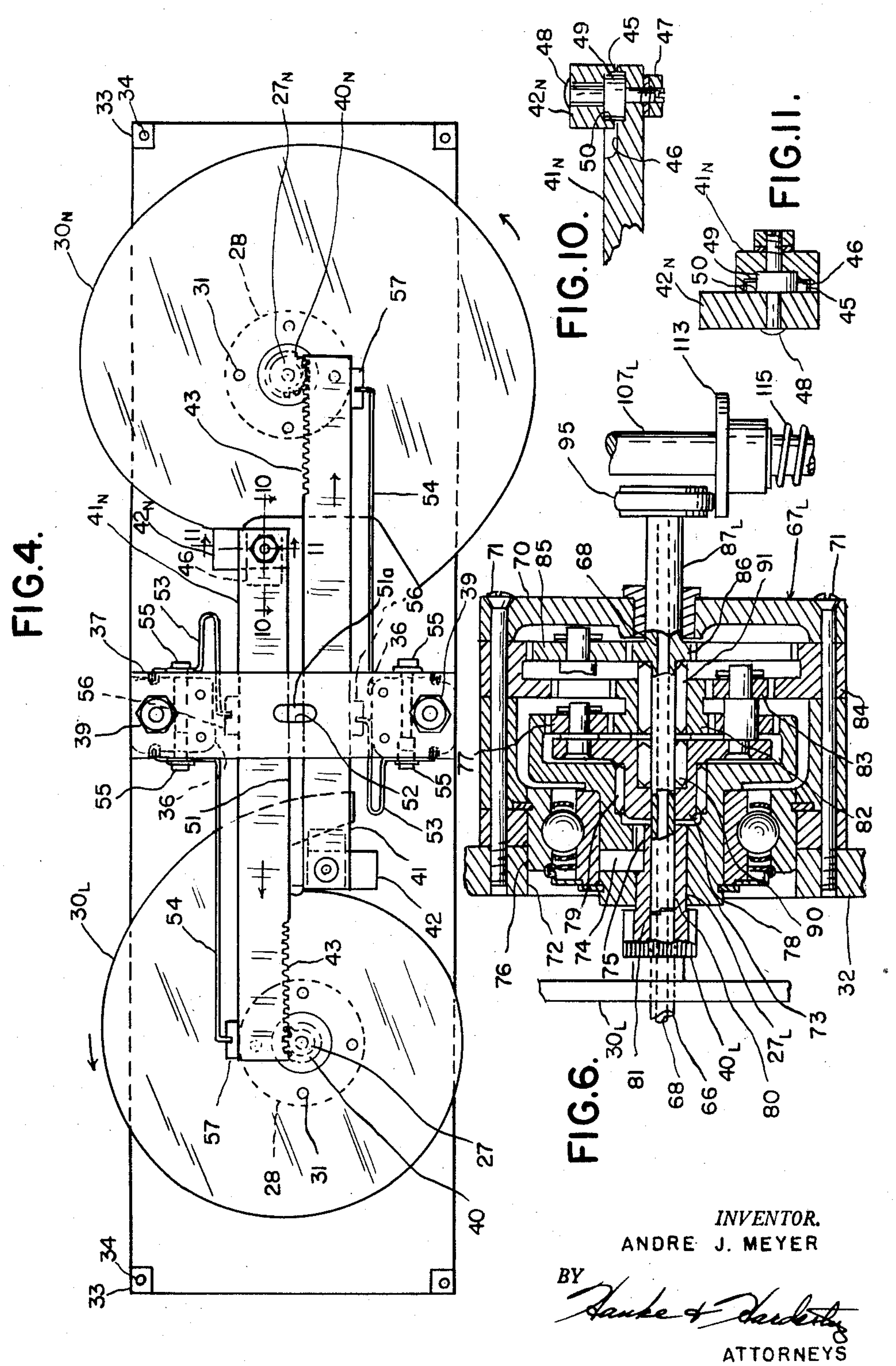
Fig. 4 is an elevational view of the cam, rack, and gear mechanism as viewed from the back, with the rear plate removed for convenience.
Fig. 6 is a cross sectional detail view taken substantially on the line 6—6 of Fig. 5.
Fig. 10 is an enlarged fragmentary cross-sectional view taken substantially on the line 10—10 of Fig. 4.
Fig. 11 is an enlarged fragmentary cross-sectional view taken substantially on the line 11—11 of Fig. 4.

A support plate 32 is spaced from the mounting plate 25 by spacers 33 at the four corners and secured by any means such as screws 34. In Fig. 4, the support plate 32 has been omitted for convenience of illustration.

A spacing member 35 is positioned substantially midway between the ends of the plate 25 and is provided with a slot 36, as shown in Fig. 7. A plate 37 closes this slot. The spacing members 35 and the plate 37 are assembled in between the mounting plate 25 and the support plate 32, after which the entire assembly may be secured to bosses 38 projecting from the front interior of the casing 12 by any suitable means such as bolts 39.

The shafts $27_N$ and $27_L$ are provided with pinion gears $40_N$ and $40_L$. Rack assemblies $41_N$ and $41_L$ are adapted to slide freely in a lateral direction through the slot 36 and are provided with cam followers $42_N$ and $42_L$ which contact the respective cams $30_N$ and $30_L$. Teeth 43 on the other ends of the rack assemblies $41_N$ and $41_L$ engage with the pinion gears $40_N$ and $40_L$.

This rack, gear, and cam arrangement is the essence of the computer, operating as follows: As seen in Fig. 4, rotation of the number shaft $27_N$ in a counterclockwise direction, by means to be described, rotates the cam $30_N$ secured thereto, actuating the rack $41_N$ to the left. The rack teeth 43 engaged with the pinion $40_L$ act to rotate the shaft $27_L$ and cam $30_L$ also in a counterclockwise direction. Rotation of the log shaft $27_L$ and the cam $30_L$ act to mutually rotate each other. Due to the shapes of the cams $30_N$ and $30_L$, the angles of rotation in the shafts $27_N$ and $27_L$ are not the same. The contour of the cam $30_N$ has been so computed that the angle of rotation effected on the shaft $27_L$ is a logarithmic function of the angle of rotation of the shaft $27_N$ at all times. The contour of the cam $30_L$ is such that it will actuate the rack $41_L$ in exact correspondence to the original rotation of the shaft $27_N$. Or to put it another way, the contour of the cam $30_L$ has been so computed that the angle of rotation effected on the shaft $27_N$ is an anti-logarithmic function of the angle of rotation of the shaft $27_L$ at all times. This makes actuation of the shafts $27_L$ and $27_N$ completely reversible. Each shaft may first be rotated counterclockwise to any desired setting and then clockwise to return to its initial position shown in Fig. 4.

The rack and cam construction will of course be determined by the function relationship desired. For example, let $\theta_N$=Rotation in radians of shaft $27_N$ with respect to the point where the number N is 1.

$\theta_L$=Rotation in radians of shaft $27_L$ with respect to the point where the logarithm L is 0.

$X_N$=Travel in inches of rack $41_N$ with respect to the point where the number N is 1.

$X_L$=Travel in inches of rack $41_L$ with respect to the point where the logarithm L is 0.

$D$=Pitch diameter in inches of the pinions $40_N$ and $40_L$.

$X_0$=Distance of contact face of followers $42_N$ and $42_L$ to the axis of rotation of the shafts $27_N$ and $27_L$ respectively, when N is 1 and L is 0.

The cam contours may now be specified by tabulating $x$ as a function of $\theta$. To grind the cam, a grinding wheel is set up so that the side face of the wheel is parallel to the centerline of rotation of the cam blank. The latter is now turned to $\theta$ 0, and the rotating wheel is moved along its axis until its face reaches a distance of $x_0$ inches from the blank center. Next the wheel is moved axially through a distance $x$ away from the blank; which is next turned through the angle $\theta$ corresponding to $x$ in the table.

The relation between $\theta$ and $x$ is given by:

For the number cam—

$$\theta_N = 2\pi\frac{N-1}{10}$$

$$x_N = \pi D \text{ leg } N$$

For the log cam—

$$\theta_L = 2\pi \text{ leg } N$$

$$x_L = \pi D\frac{N-1}{10}$$

In these formulas N represents any number between 1 and 10. To complete this cycle, the number cam will make 9/10 of a turn, while the leg cam makes a full turn. With this adjustment, the dials and reduction gear units can be alike, the sector from 0 to 1 on the number dial not being used. It is further to be noted that $x_0$ must be greater than 1.4 inch in order to avoid undercutting of the number cam for values of N between 1 and 1.5.

The cam followers $42_N$ and $42_L$ are longitudinally adjustable on the respective racks $41_N$ and $41_L$. Figs 10 and 11 illustrate how the cam follower may be mounted. A lug 45 is provided on the cam follower $42_N$ and is longitudinally slidable in a slot 46 provided in the end of the rack $41_N$. The cam follower $42_N$ and the rack $41_N$ are secured together by a nut 47 and a bolt member 48 provided with an eccentric cam 49 which upon being rotated, bears on the sides of a groove 50 provided in the lug 45. This adjustment permits the taking up of clearance between each cam and the pinion on the shaft on which the other cam is mounted. The cam follower $42_L$ is similarly mounted on the rack $41_L$.

Between the racks $41_L$ and $41_N$ is a guide spacer 51 having a lug 51_a_ which projects into a vertically elongated slot 52 in the center of the plate 37, as will be seen by reference to Figs. 4 and 7 particularly. This lug and slot engagement prevents lateral motion of the spacer 51 but permits freedom of vertical movement. Springs 53 and 54, as shown in Figs. 4, 5 and 7, are secured to the spacing member 35 by any means such as bolts 55. Slide blocks 56 are secured to the ends of the springs 53 and act to press the racks $41_L$ and $41_N$ into positive engagement with the respective pinions $40_N$ and $40_L$. Thus the racks $41_L$ and $41_N$ are positively located without any side play. It would be possible to give the rack and guide spacer combination a small clockwise rotation (as viewed in Fig. 4), by overcoming the loads exerted by the springs 54, but normally the position of the racks $41_L$ and $41_N$ are positively determined, so as to provide the coupled mechanism with zero side clearance, completely eliminating errors due to the transmission of the motion from one cam to the other.

Referring to Fig. 1, it will be noted that the dials $14_L$ and $14_N$ have identical stationary numerical graduations, each dial comprising three concentric scales with respect to which three hands or pointers may be rotated in a manner similar to the hour, minute, and second hands of a clock. In the following, it will be sufficient to refer to the inner or "hour" hands $60_L$ and $60_N$, the center or "minute" hands $61_L$ and $61_N$, and the outer "second" hands $62_L$ and $62_N$, and the scale graduations corresponding thereto.

It will be seen that the graduations for the hour hands $60_L$ and $60_N$, and the minute hands $61_L$ and $61_N$ have been made to equal one hundredth (1/100) of the circumference, while the graduations for the second hands $62_L$ and $62_N$ correspond to one two hundredth (1/200) of the circumference.

The hands of each dial are mounted on three concentric driving shafts, as are seen in Figs. 3 and 5. Since the driving mechanism for both sets of hands are almost identical, only one, the log mechanism, will be described.

The hour hand $60_L$ is mounted on an outer shaft 65 which is secured directly to the camshaft $27_L$ and is part of same, so that the hour hand $60_L$ rotates at the same speed as the camshaft $27_L$. Similarly, the hour hand $60_N$ rotates at the same speed as the camshaft $27_N$.

The number cam $30_N$ secured to the shaft $27_N$ is so designed that during nine-tenths (9/10) revolution, it will cause a corresponding full revolution of the log camshaft $30_L$. The hour hands $60_N$ and $60_L$ are so timed that with the hand $60_N$ set at one on the innermost number scale, the hand $60_L$ will point to zero on the innermost log scale. In the position shown as an example in Fig. 1, the hand $60_N$ points to the value 2.3 and the hand $60_L$ points to the value .37, which respectively represent the number and its logarithm both expressed in two digits.

The minute hand $61_L$ is mounted on a central shaft 66 which extends through the outer shaft 65 and the camshaft $27_L$ to a gearbox assembly $67_L$ where through suitable step up gearing to be described it is operatively connected to the camshaft $27_L$ in the ratio of one hundred to one (100:1). Thus the hand $61_L$ will make one revolution each time the hand $60_L$ turns through 1/100 of 360°. Similarly, the hand $61_N$ will make one revolution for 1/100 revolution of the hand $60_N$. In this manner the next two digits are obtained, the dial reading of Fig. 1 corresponding to N=2.354 and L=.3718.

The process could be repeated by providing another 100:1 step up gearing between the second and minute hands, so that the number hands could be adjusted to any six digit number, having sufficient precision of construction in the cam and cam drive mechanism, it would be possible to read the logarithm of this number directly in six decimals without resorting to interpolation.

However, in such a six decimal log computer the speed ratio between the second and hour hands would be 10,000 to 1. Even if the cam should be rotated as slowly as one r.p.m., the second hand would spin at 10,000 r.p.m. Thus the operation of the computor would have to be unnecessarily slow to avoid prohibitive speeds of the second hands. For this reason, in the device shown, only a 5 to 1 step up gearing is installed between the second and the minute hands, yielding an overall ratio of 500 : 1 instead of 10,000 : 1. Thus one hundredth of a revolution of the hand $61_L$ corresponds to one twentieth of a revolution of the hand $62_L$, which is mounted on an inner shaft 68 extending through the shaft 66 to the gear box $67_L$. Similarly, one hundredth of a revolution of the hand $61_N$ corresponds to one twentieth of a revolution of the hand $62_N$.

The space of 1/20 of the circumference of each outer scale on the dials is subdivided into ten graduations, and in this manner the fifth digit may be accurately determined. On the dials illustrated, each one twentieth of the circumference of the outer scale graduations is marked with a 0, and the fifth digit is determined by reading the number of graduations between the point of the second hand and the nearest 0 encountered in a counterclockwise direction. Thus the five digit readings shown in Fig. 1 are read as N=2.3543 and L=.37186.

It may be noted that a direct reading log table, capable of reading five decimal logs of any five-digit number, would normally require 240 pages of print.

The gear box $67_L$, as shown in Fig. 6, comprises a support casing 70 secured together and mounted on the support plate 32 by any means such as screws 71, being supported in a hole 72 provided in the plate 32.

A ring gear member 73 is mounted on the shaft $27_L$, which it drives through a pin 74 removably engaged with a slot 75 in the end of the shaft $27_L$. The ring gear member 73 is rotatably supported by the hole 72 and the casing 70 by means of a bearing 76.

The ring gear member 73 is operatively engaged with a planet gear 77 rotatably supported in the ring gear member 73 by a bearing 79 and drives a shaft 80 which is removably engaged with the end of the minute hand shaft 66 by any means such as a tongue and groove joint 81. The gear ratio between the carrier 78 and the ring gear member 73 is 100 : 1.

A sun gear member 82 is operatively engaged with the planet gear 77 and with a second planet gear 83 also rotatably carried by the planet carrier 78 and engaged with a stationary ring gear member 84. A third planet gear 85, also rotatably carried by the planet carrier 78, is engaged between the ring gear member 84 and a sun gear 86 having a shaft 87 which is connected to an inner shaft 68 extending through the shafts 80, and 66, and carries the second hand 62. The shaft 87 is rotatably carried in the planet carrier 78 as by a bearing 90, and the sun gear member 82 is rotatably carried on the shaft 87 as by a bearing 91. The gear ratio between the sun gear 86 and the ring gear 73 is 500:1.

It will be apparent that any gear means may be used, provided the desired gear ratios are maintained. The particular mechanism shown in Fig. 6, however, is preferred for compactness and since it may be entirely contained in the casing 70, which may readily be removed and disengaged from the computer mechanism camshaft as a unit. The mechanism of the gear box $67_N$ connected with the camshaft $27_N$ is identical with the gear box $67_L$ described above.

The shafts $87_L$ and $87_N$ are provided with friction driven wheels 95 which are adapted to be driven through a differential assembly 96 from either a reversible variable speed electric motor 97 or a manually operated handle 98.

As shown in Figs. 2 and 3, the motor 97 has a drive shaft 99 provided with a friction drive wheel 100. The differential assembly, as seen in Figs. 8 and 12, comprises a rotatable casing 101 driven by the drive wheel 100 and a spool 102 which is rotatably carried on a pin 103 secured transversely to the casing 101. A flat spring 103, through a washer 104 and a bushing 105, force the spool 102 into driving contact with friction rings 106 mounted on drive shafts $107_N$ and $107_L$ which rotatably carry the casing 101 on bushings 101*a*.

A bracket 110 is secured to the support plate 32 by any means such as screws 111. The motor 97 is mounted on the bracket 110 and the shaft $107_N$ is rotatably supported thereby, as illustrated in Figs. 2 and 3.

The ends of the shafts $107_N$ and $107_L$ are preferably respectively supported on the gear boxes $67_N$ and $67_L$ by any means such as bearings 112 secured to the gear boxes 67*a* and 67*b* by bolts 112*a*. Each shaft $107_N$ and $107_L$ is provided with disc driving members 113, which are in friction driving contact with the driven wheels 95 of the shafts $87_N$ and $87_L$. Hubs 114 are secured to the shafts $107_N$ and spaced from the disc driving members 113. Springs 115 between the hubs 114 and the disc driving members 113 serve to spring load the disc driving members 113 against their respective driven wheels 95.

This differential drive arrangement operates on the high speed sides of the gear boxes $67_L$ and $67_N$; that is, on the shafts $87_L$ and $87_N$ respectively connected to the second hands $62_L$ and $62_N$. The two hands $62_L$ and $62_N$ are thus driven at variable speeds, the sum of their rotations being always equal to approximately twice the rotation of the differential casing 101. The cam, rack and gear mechanism previously described serves to determine the precalculated relative speeds of the shafts $27_N$ and $27_L$ which are driven by the shafts $87_N$ and $87_L$ through the gear reduction trains of the gear boxes $67_N$ and $67_L$.

Preferably, the reversible motor 97 has approximately 3400 r.p.m. top speed output, and may drive the differential assembly casing 101 at approximately 5000 r.p.m. at top speed. The shaft $87_N$ will then be variably rotated at approximately 1875 to 6970 r.p.m. and the shaft $87_L$ will be variably rotated respectively at approximately 8125 to 3030 r.p.m. Thus, 450 rotations of the second hand $62_N$ and 500 rotations of the second hand $62_L$, which correspond respectively to 9/10 of a rotation of the hour hand $60_N$ and one rotation of the hour hand $60_L$, completing the scale coverage, may be accomplished in approximately 5.2 seconds.

Use of the motor 97 thus provides for rapid approximate settings of the computer, after which the handle 98 may be used for exact manual setting of the computer. The handle 98 is preferably coupled to the motor drive shaft through a magnetic clutch assembly 120 and an intermediate shaft 121.

As seen in Fig. 9, the magnetic clutch assembly 120 comprises a housing 122 preferably secured to the computor casing 12 by screws 123, and a solenoid 124 provided with a soft steel casing assembly 125 contained in the housing 122. A clutch shaft 126 coupled to the intermediate shaft 121 and a handle shaft 127 secured to the handle 98 are provided respectively with soft steel hubs 128 and 129. The hubs 128 and 129 are provided with flanges **128*a* and 129*a* having matching teeth 128*b* and 129*b* on their adjoining faces, between which there is a small clearance. There is no metallic contact between the hubs 128 and 129 other than through a nonmagnetic bushing 130 which is provided to align the shafts 126 and 127. When the solenoid 124 is energized, magnetic lines of flux, as indicated by the arrows in Fig. 9, are established in the soft steel magnetic circuit composed of the casing 125 and the hubs 128 and 129. A high intensity of flux occurs through the matching teeth 128*b* and 129*b*, and much less between them. Thus the teeth will be firmly magnetically coupled to transmit rotation between the handle 98 and the intermediate shaft 121**.

The magnetic clutch 120 is adapted to be energized when the motor is not running, as indicated by the preferred electrical circuit shown in Fig. 13. A three-way rheostat switch 135 is preferably mounted on the computer casing 12 as shown in Fig. 5 and is connected to any suitable power source 136. The switch 135 is preferably spring-loaded to the center or "clutch" position, indicated by "CL" in Figs. 13 and 14. The motor being inoperative in this position, the computer may be set by the handle 98 through the energized magnetic clutch 120. The switch may be operated to either the forward (Fwd) or the reverse (Rev) position, operating the motor 97 in either desired direction at any range of speed and simultaneously disengaging the magnetic clutch so that the drive shaft 99 of the motor 97 will not spin the handle 98 through the intermediate shaft 121. It will be apparent that the handle and the magnetic clutch could easily be eliminated, if a proper type of rheostat switch 135 is utilized to provide the motor with a broad variable output. If very slow speed operation as well as high speed operation, is provided, exact settings could thus be made by means of the motor 97 alone.

In summary, the computor hands are set by operation of either the motor 97 or the handle 98, rotating the differential assembly 96 which causes a variable rotation of the shafts $87_L$ and $87_N$ of the gear boxes $67_L$ and $67_N$. The gear box operates to provide the dial hands with their desired rotation ratios. The relative degree of rotation between the number dial hands and the log dial hands is determined by the contour of the cams $30_L$ and $30_N$ which are directly connected through the camshafts $27_L$ and $27_N$ to the respective dial hands, and are indirectly connected to each other through the racks $41_L$ and $41_N$ operatively engaged respectively to the pinions $40_N$ and $40_L$ mounted on the camshafts $27_N$ and $27_L$. This mutual interaction of the camshafts $27_N$ and $27_L$ is computed to provide direct number to logarithm relationships between the position of the respective number and log hands, whose positions are read directly on the numerically graduated dials $14_N$ and $14_L$.

It will be apparent to one skilled in the art to which my invention pertains that various changes and modifications may be made without departing from the spirit of the invention or the scope of the appended claims.

I claim:

1. A function computer comprising a pair of rotatable shafts, driving means for rotating said shafts, control means operatively connecting said shafts and comprising a cam mounted on each shaft and actuating means operatively connecting each cam with the shaft on which the other cam is mounted whereby said shafts will mutually actuate each other, said cams being dissimilarly contoured so as to obtain a predetermined relative rotation of said shafts, and means for indicating the rotations of said shafts, said actuating means comprising a pinion gear mounted on each shaft and a pair of racks, each rack being operatively engaged with one pinion gear and slidably contacting the cam mounted on the other gear shaft.

2. A function computer comprising a pair of rotatable shafts, driving means for rotating said shafts, control means operatively connecting said shafts and comprising a cam mounted on each shaft and actuating means operatively connecting each cam with the shaft on which the other cam is mounted whereby said shafts will mutually actuate each other, said cams being dissimilarly contoured so as to obtain a predetermined relative rotation of said shafts, and means for indicating the rotations of said shafts, said actuating means comprising a pinion gear mounted on each shaft and a pair of racks, each rack being operatively engaged with one pinion gear and slidably contacting the cam mounted on the other gear shaft, said shafts having parallel axes, said racks being parallel with each other and operative in a plane normal to the shaft axes.

3. A function computer comprising a pair of rotatable shafts, driving means for rotating said shafts, control means operatively connecting said shafts and comprising a cam mounted on each shaft and actuating means operatively connecting each cam with the shaft on which the other cam is mounted whereby said shafts will mutually actuate each other, said cams being dissimilarly contoured so as to obtain a predetermined relative rotation of said shafts, and means for indicating the rotations of said shafts, said actuating means comprising a pinion gear mounted on each shaft and a pair of racks, each rack being operatively engaged with one pinion gear and slidably contacting the cam mounted on the other gear shaft, said shafts having parallel axes, said racks being parallel with each other and operative in a plane normal to the shaft axes, said racks being simultaneously actuated in opposite directions upon rotation of said shafts.

4. A function computer comprising a pair of rotatable shafts, driving means for rotating said shafts, control means operatively connecting said shafts, said control means constructed and arranged to maintain a predetermined variable degree of rotation of one of said shafts relative to the other of said shafts, said driving means comprising a single driving instrumentality and a differential element for variably apportioning power from the driving instrumentality to both of said shafts as determined by said control means, and means for indicating the rotations of said shafts, said control means comprising a planar cam mounted on each shaft and actuating means slidably contacting each cam for operatively connecting each cam with the shaft on which the other cam is mounted whereby said shafts will mutually actuate each other, said cams being dissimilarly contoured so as to obtain a precalculated relative rotation of said shafts.

5. A function computer comprising a pair of rotatable shafts, driving means for rotating said shafts, control means operatively connecting said shafts, said control means constructed and arranged to maintain a predetermined variable degree of rotation of one of said shafts relative to the other of said shafts, said driving means comprising a pair of reduction gear means respectively drivingly connected to said shafts, a single driving instrumentality, and a differential element for variably apportioning powder from the driving instrumentality to both of said reduction gear means as determined by said control means, and means for indicating the rotation of said shafts, said control means comprising a planar cam mounted on each shaft and actuating means slidably contacting each cam for operatively connecting each cam with the shaft on which the other cam is mounted whereby said shafts will mutually actuate each other, said cams being dissimilarly contoured so as to obtain a precalculated relative rotation of said shafts.

6. A function computer comprising a pair of rotatable shafts, driving means for rotating said shafts, control means operatively connecting said shafts, said control means constructed and arranged to maintain a predetermined variable degree of rotation of one of said shafts relative to the other of said shafts, and means for indicating rotations of said shafts, said control means comprising a planar cam mounted on each shaft, an actuating means slidably contacting each cam and operatively connected with the shaft on which the other cam is mounted whereby said shafts will mutually actuate each other relative to the contours of said cams, said cams being dissimilarly contoured to obtain a precalculated relative rotation of said shafts.

References Cited in the file of this patent

UNITED STATES PATENTS

| | | |
|---|---|---|
| 1,245,344 | Howden | Nov. 6, 1917 |
| 1,482,152 | Ross | Jan. 29, 1924 |
| 2,349,118 | Simpson | May 16, 1944 |
| 2,485,200 | Imm | Oct. 18, 1949 |
| 2,665,069 | Imm | Jan. 5, 1954 |

FOREIGN PATENTS

| | | |
|---|---|---|
| 13,556 | Great Britain | Sept. 23, 1915 |